United States Patent
Burg et al.

(10) Patent No.: US 6,400,723 B1
(45) Date of Patent: Jun. 4, 2002

(54) MULTIPLEXING SYSTEM AND METHOD FOR INTEGRATED VOICE AND DATA TRANSMISSION ON NETWORK

(75) Inventors: Frederick Murray Burg, West Long Branch; Mostafa Hashem Sherif, Tinton Falls; Kamlesh T. Tewani, Freehold, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/956,992

(22) Filed: Oct. 23, 1997

(51) Int. Cl.<sup>7</sup> .................................................. H04J 3/00
(52) U.S. Cl. ......................... 370/412; 370/529; 370/537
(58) Field of Search ................................ 370/352, 353, 370/354, 355, 356, 357, 375, 376, 377, 378, 412, 415, 428, 429, 465, 468, 470, 474, 493, 494, 495, 532, 533, 537, 538, 540, 527, 528, 529

(56) References Cited

U.S. PATENT DOCUMENTS

| | | | |
|---|---|---|---|
| 4,589,107 A | | 5/1986 | Francisco |
| 4,914,650 A | | 4/1990 | Kotikalapudi |
| 5,526,353 A | * | 6/1996 | Henley et al. ............... 370/392 |
| 5,920,559 A | * | 7/1999 | Awaji .......................... 370/392 |
| 6,038,232 A | * | 3/2000 | Jung et al. ................... 370/395 |

FOREIGN PATENT DOCUMENTS

JP 59044140 6/1984

* cited by examiner

Primary Examiner—Kwang Bin Yao

(57) ABSTRACT

An integrated sub-rate multiplexing system and method optimizes use of transmission bandwidth in integrated networks. For example, transmission capacity of the Public Switched Telephone Network (PSTN) is assigned to various traffic types according to the instantaneous needs, illustratively in an enhanced ($T_1$, $T_2$)-environment. When speech and data packets compete for bandwidth, under certain conditions portions of data are concatenated to the voice segment, increasing bandwidth efficiency.

19 Claims, 2 Drawing Sheets

MULTIPLEXING SYSTEM AND METHOD FOR INTEGRATED VOICE AND DATA TRANSMISSION ON NETWORK

BACKGROUND OF THE INVENTION

1. Field of Invention

The invention relates to communication technology, and particularly to efficient transmission of information over networks that service both voice and data traffic.

2. Description of Related Art

Integrated multiplexing schemes attempt to optimize the use of instantaneous transmission bandwidth available in networks for different kinds of data streams. In the case of communication over telephone networks, one prevailing policy is to allocate the transmission capacity of the Public Switched Telephone Network (PSTN) to various traffic types, according to instantaneous needs of originating sources and data destinations.

Integrated transmission on PSTN networks is expected to handle increasing traffic of various types, including voice, facsimile, voiceband data, digital data and video services and others. In particular, when the PSTN interfaces with the Internet a typical network node in this type of communications environment receives packets of different traffic types from various terminals. The traffic is stored according to the order of arrival, and then transmitted to desired destinations using some transmission policy. Because the switching and transmission resources of the networks are shared among the various types of traffic, efficient use of the channel bandwidth becomes important to meet performance requirements (e.g., packet loss, delay, etc.) of differing traffic types. For example, voice is more tolerant to the loss of information than data, but is intolerant of substantial delay or jitter.

There have been many approaches in the art to multiplexing heterogeneous traffic types, some of which are currently or have been used in commercial systems. Existing methods can be classified according to several types.

These types can be divided according to the type of traffic to be multiplexed (voice and voiceband data, voice and facsimile, etc.), the access method (i.e., synchronous or asynchronous multiplexing), and the bandwidth over which the multiplexing is taking place. For example, digital types include narrowband ISDN at 64 kbit/s channel, wideband ISDN using several 64 kbit/s channels, primary rate (1544 kbit/s or 2048 kbit/s) channels, broadband channels (at ATM bit rates of 100 Mbit/s or above) or sub-rate channels, i.e., <64 kbit/s channel.

In terms of emerging digital technology, conventional multiplexing schemes for narrowband and wideband ISDN fall into one of the three following classes.

1. Fixed Boundary Multiplexing Scheme

This ISDN scheme is based on synchronous time-division multiplexing (TDM), where the TDM frame consists of N slots each b bits wide. $N_1$ of the N channels are allocated to voice, and the remaining $(N_2 = N - N_1)$ to data. The value of $N_1$ is chosen according to the voice bit rate and the duration of the TDM frame. However, this scheme suffers from large time delay and blocking probabilities. The problem is compounded when one type of traffic is temporarily absent; the corresponding allocated slots will not be used, even if the other type of traffic is delayed or blocked. For example, excess voice packets are blocked (or dropped) even if slots allocated for data packets are available (e.g., when there are no data packets), degrading voice quality.

2. Movable Boundary Multiplexing Scheme

In this scheme, voice and data traffic still share channel capacity on the basis of a synchronous TDM scheme. Here, voice traffic receives priority over data traffic, but when there is no voice traffic the transmission bandwidth is used exclusively for data traffic. Thus, data packets may occupy any of the $N_1$ slots temporarily not used, while voice traffic pre-empts data traffic and occupies one of its allocated slots if necessary to receive service. This scheme reduces the average queuing delay for data, but does not improve blocking performance for voice. This scheme also cannot be relied upon to increase data throughput because extraordinarily long data queues may result. Flow control of data traffic is thus required to ensure that the data traffic load is kept within reasonable bounds. The scheme also does not take into account the fact that silent periods constitute a significant amount (60%) of the time that a person speaks. These factors have been taken into account in the modified movable boundary schemes of the following digital circuit multiplication equipment (DCME).

3. DCME Schemes

Several proprietary DCME multiplexing schemes are in commercial use. To facilitate networking, a standard scheme has been developed in the various versions of industry standard ITU-T (formerly CCITT) Recommendation G.763. The idea is to combine talk-burst with various voice-encoding schemes using lower bit rates than the traditional 64 kbit/s PCM for voice. In addition, DCME demodulates facsimile traffic to transport the baseband signal instead of a 64 kbit/s stream of the digitized modulated baseband signal. These features have been introduced to balance high channel multiplication ratios with high quality voice and data transmission, as known in the art.

DCME accomplishes this by generating bearer channels consisting of full-time four-bits/sample for 32 kbit/s ADPCM derived from the 64 kbit/s time slots. 24 kbit/s and 16 kbit/s overload channels are created from the bearer channels whenever the demand for voice service exceeds the number of available channels. This presumes use of variable bit rate coding for voice, so that voice channels can be coded with less bits per sample. The reduction in bits per sample is spread among all voice channels on a pseudo-random basis. For voiceband transmission, data transmission up to 9600 bit/s can be supported by five-bits/sample transmission operation. Higher bit rates and digital data transmission use 8-bits/sample transmission operations for "clear" or "transparent" 64 kbit/s operation. Thus, the bearer channels are divided into pre-assigned bearer channels for data and voiceband data operation, voice bearer channels, facsimile channels and overload channels. The pre-assigned channels are fixed. The boundaries between the other channels vary according to the traffic mix and the desired quality. For example, to minimize "freeze-out" of speech (clipping that occurs when the number of talk-bursts exceed the transmission capacity), the requests for assignment to servers are placed in an assignment queue. Whenever the load increases beyond a given threshold, the controller increases the number of available overload channels to serve the additional load, and improves utilization of the available bandwidth. Finally, when the dynamic load reaches a given threshold, DCME signals to the switch that no more calls should be accepted. The configuration data of a DCME frame includes all the information necessary to define the structure of the transmit and receive bearers.

The main differences between the various schemes just described reside in how transmission bandwidth is divided, and how incoming channels are mapped to the bearer channels. Because DCME schemes are based on time-division multiplexing, they can be efficient in their use of transmission bandwidth if the traffic is predominantly voice, voiceband data at rates of 14,400 bits/s, 9600 bits/s or less, or facsimile. However, because voice traffic is not allowed to use the idle time slots of the pre-assigned channels, it could result in bandwidth inefficiency when data traffic is low. Although DCME can be adapted to multi-point applications, this requires extensive coordination among the various destinations.

4. $(T_1, T_2)$ Techniques

A further implementation of an integrated multiplexing scheme known in the art is $(T_1, T_2)$ multiplexing. The basic idea of the $(T_1, T_2)$ scheme is to share the available transmission bandwidth between voice and data on a statistical basis. The objective is to make efficient use of transmission bandwidth while meeting the performance requirements of three types of traffic: signaling, voiceband and digital data traffic. This makes the scheme well adapted to packet networks. Signaling is (in band signaling such as robbed-bit signaling).

In $(T_1, T_2)$, each of the three traffic types has a specific traffic queue. There are relatively few signaling messages; they arrive sporadically but must be served with the highest priority on a first-in first-out (FIFO) basis. Therefore, the signaling queue can pre-empt the service of the other two queues. This guarantees that signaling packets experience minimum delay and zero packet loss due to congestion or delay.

In the $(T_1, T_2)$ environment, voiceband packets are served for either a predetermined interval of $T_1$ seconds or until exhaustion of the voice buffer, whichever occurs first. The arrival of a signaling message interrupts the voice server and the timer $T_1$ is suspended until the entire signaling message is transmitted. Service returns to the interrupted voice queue and the timer $T_1$ resumes.

On the data side, the data buffer is likewise served for $T_2$ seconds or until the data buffer is empty, whichever occurs first. The predetermined intervals $T_1$ and $T_2$ are of the order of a few multiples of a packet's transmission time but may be of different durations. With existing VLSI technology the switch-over time from one queue to another is very small compared to the length of a packet and is therefore ignored.

The known $(T_1, T_2)$ multiplexing scheme guarantees a certain minimum bandwidth for each type of traffic. Usually, the signaling traffic occupies a negligible portion of the overall transmission capacity C. Therefore, the scheme guarantees a minimum bandwidth of $$\frac{(T_1)}{[T_1 + T_2]} C \qquad \text{Equation 1}$$

for voiceband traffic and of $$\frac{(T_2)}{[T_1 + T_2]} C \qquad \text{Equation 2}$$

for digital data.

The advantage of the $(T_1, T_2)$ scheme is that it protects each type of traffic from congestion caused by the other types, so long as that first type remains within its guaranteed bandwidth. Concurrently, the multiplexer allocates to each type of traffic any spare bandwidth momentarily available because other types are not present.

If $(T_1, T_2)$ is combined with the embedded ADPCM coding scheme of ITU-T/CCITT G.727, voice traffic can be well protected as compared to a FIFO queue approach. Similarly, there is a marked improvement for the delay performance of data traffic at the expense of a mild degradation in voice performance.

The Integrated Access Terminal (IAT) of AT&T's Integrated Access and Cross-connect System (IACS) implemented these $(T_1, T_2)$ principles, performing compression and packetization of voice and integration of that voice information with packetized voiceband data, demodulated facsimile, digital data, channel-associated signaling as well as frame relay traffic. IAT interfaces correspond to ITU-T/CCITT Recommendations G.703/G.704 at the physical level and G.764/G.765 at the link, packet and higher layers.

At one time, IACS was used in over 45 countries in gateway applications, in in-country public, private, and cellular networks. In all these applications, most of the traffic is voiceband (voice and facsimile) and there is little digital data. In practice in such systems, the values of parameters $T_1$ and $T_2$ have been set to 8 ms and 2 ms respectively.

The $(T_1, T_2)$ scheme has been extended to multiple traffic classes under the name of the dynamic time-slice scheme. However, the extension does not include the case of voiceband data traffic (including facsimile). The extension to this case is needed to apply the system to sub-rate multiplexing, since most of the data traffic (including video) is coming through modems such as V.34 or other high speed modems.

Another known extension of the $(T_1, T_2)$ scheme is to adapt the value of the timers $T_1$ and $T_2$ instead of relying on predetermined values. However, even in this adaptive approach, the time $T_1$ is for all voiceband traffic which includes voice, voiceband data and facsimile. In the future, it is expected that the sub-rate link utilization for the various traffic types will vary dynamically, especially if video utilization increases. However, video also will be treated as voiceband data, and therefore the current formulation of the various $(T_1, T_2)$ schemes and its adaptive version need to be modified to fit with sub-rate multiplexing that can be used on the PSTN. Finally, in-band signaling is not used in modern telecommunications networks, therefore the original $(T_1, T_2)$ will also have to be modified.

5. Sub-Rate Multiplexing

Sub-rate multiplexing is often used in an end-user terminal. Therefore, sub-rate multiplexing imposes several conditions such that the total bandwidth available for all traffic is less than 64 kbit/s. Efficient voice algorithms are used to preserve as much bandwidth as possible for the other traffic types. The use of Adaptive Differential Pulse Code Modulation (ADPCM) does not achieve toll-grade quality voice at bit rates lower than 32 kbit/s. Therefore, to have toll-grade quality voice with bit rates of 8 kbit/s or lower, other voice coding algorithms based on the Code Excited Linear Prediction technique have to be used.

Because sub-rate multiplexing is used in an end-terminal, the traffic is coming from a single endpoint. Therefore, statistical techniques that can be used in wideband multiplexing are not available.

Low bit rates impose another set of conditions for sub-rate multiplexing. For example, to minimize the amount of control overhead in a packet system, the packetization time must be increased. For example, at 32 kbit/s it is possible to form a 64 octet packet with a packetization interval of 16 ms. At 8 kbit/s, a 64 octet packet will require a packetization interval of 64 ms. This delay is unacceptable for several reasons:

a. It imposes a tail length larger than the 64 ms used for most current echo cancellers.

b. It adds unacceptable delays in the network.

The ITU-T/CCITT recommends that one-way delay in a voice call not exceed 400 ms. Many international networks involve satellites and associated delays, and signal processing techniques interposed in the network to improve voice quality can push the delay over that total. If the enhancement in quality is significant, this would overcome the degradation due to additional delay. However, if the delay is added only for the multiplexing part, nothing will compensate the degradation due to the additional delay. In addition, applications using retransmission to overcome errors may suffer from reduced throughput when one-way delay is larger than 35 ms.

c. The sub-rate multiplexer will accommodate voice, facsimile, other voiceband data, and video, all treated as voiceband traffic.

Because of these considerations, low bit rate multiplexers require a smaller packetization delay. This translates into a higher percentage of bits used for addressing and control in each packet.

However, the various known schemes fall short of optimal performance across a wide variety of conditions, as described above. Enhanced performance in transmission integration is always sought.

SUMMARY OF THE INVENTION

The invention overcoming these and other problems in the art relates to an enhanced multiplexing scheme that can be used in a $(T_1, T_2)$-based transmission environment. The multiplexing system and method of the invention heightens data integration and expands throughput capabilities, while increasing efficiency and reliability compared to known approaches.

The invention provides an optimized multiplexing scheme that considers the various types of voiceband traffic independently, and that minimizes transmission overhead, including by selective insertion of voice and data into hybridized information frames.

The invention consequently delivers an efficient packet system that can be used to multiplex low-bit rate video, facsimile, voiceband data and voice from a single user in one unified $(T_1, T_2)$ environment.

The invention can be conceived in distinction to existing ITU-T/CCITT Recommendation V.76 and its Annex A (see—CITE—, incorporated by reference). V.76 describes an explicit suspend/resume mechanism to suspend data transmission when voice is present. The invention as described herein in contrast relies on an implicit suspend resume/ mechanism. The explicit mechanism of V.76 requires the definitions of a new flag. Most HDLC chips do not support this mechanism. Also HDLC flag detection is very susceptible to bit errors which makes the mechanism not reliable. The approach involved in the invention avoids both problems.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

The multiplexing system and method of the invention will be described assuming two traffic types, voice and voiceband data, for ease of description. The invention however can be extended to more than two traffic types by giving every traffic type its own separate queue server, and then using the Dynamic Time-Slice service strategy, as known in the art (described for instance by M. H. Sherif and M. P. Bosse, "Les Paquets de Bande Elargie: une Nouvelle Technique de Transmissions" Annales des Telecommunications, 46, No. 7–8, 1991, pp. 392–407; K. Sriram, "Dynamic Bandwidth Allocation and Congestion Control Schemes for Voice and Data Multiplexing in Wideband Packet Technologies," IEEE INFOCOM'90, pp. 1003–1009, each incorporated herein by reference).

Figure 3:
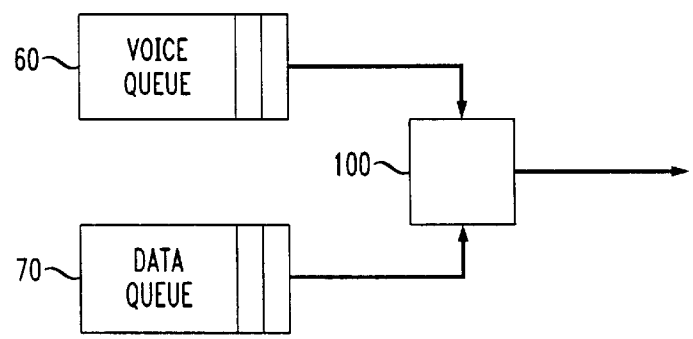
FIG. 3 illustrates the multiplexing action of a packet selector according to the invention.

As shown in FIG. 3, in the description of the invention it is assumed that a multiplexer 100 contains two queues:

1. A voice queue 60, to store voice (speech) packets, and
2. A voiceband data queue 70, to store voiceband data packets.

Figure 4:
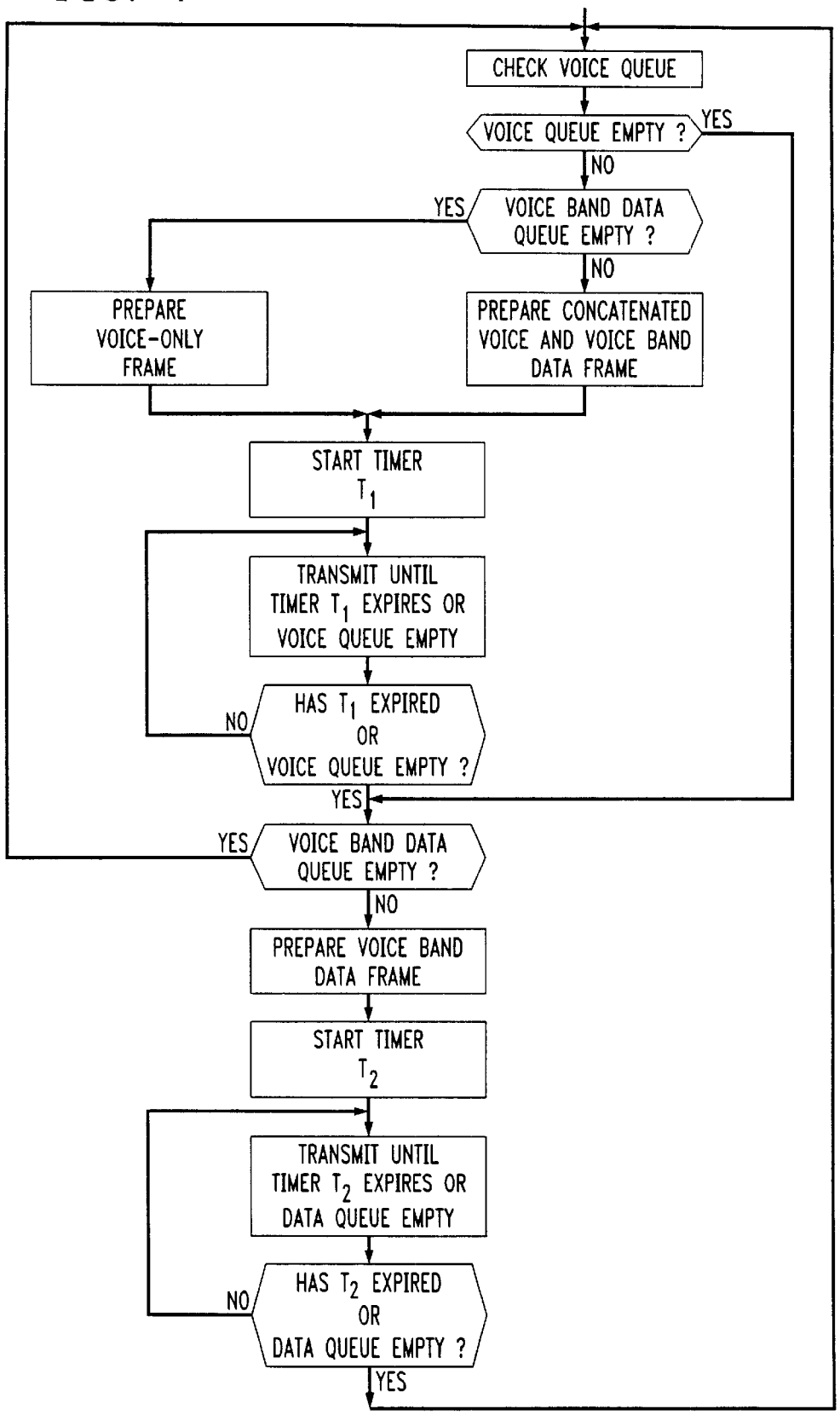
FIG. 4 illustrates a flowchart for composing frames according to the invention.

In executing a service strategy for these queues, the multiplexer system and method of the invention carries out the following algorithm, generally illustrated in the flowchart of FIG. 4. If the voiceband data queue 70 is empty, the voice queue 60 is served as in traditional schemes (discussed above) for $T_1$ ms. Only voice packets are included in the frame information field 80 (FIG. 2) for transmission. This approach suffers from a reduction of efficiency, but because all the bandwidth is available for voice, this is not important. After $T_1$ ms, the voiceband data queue 70 is checked to determine whether it is empty.

Figure 2:
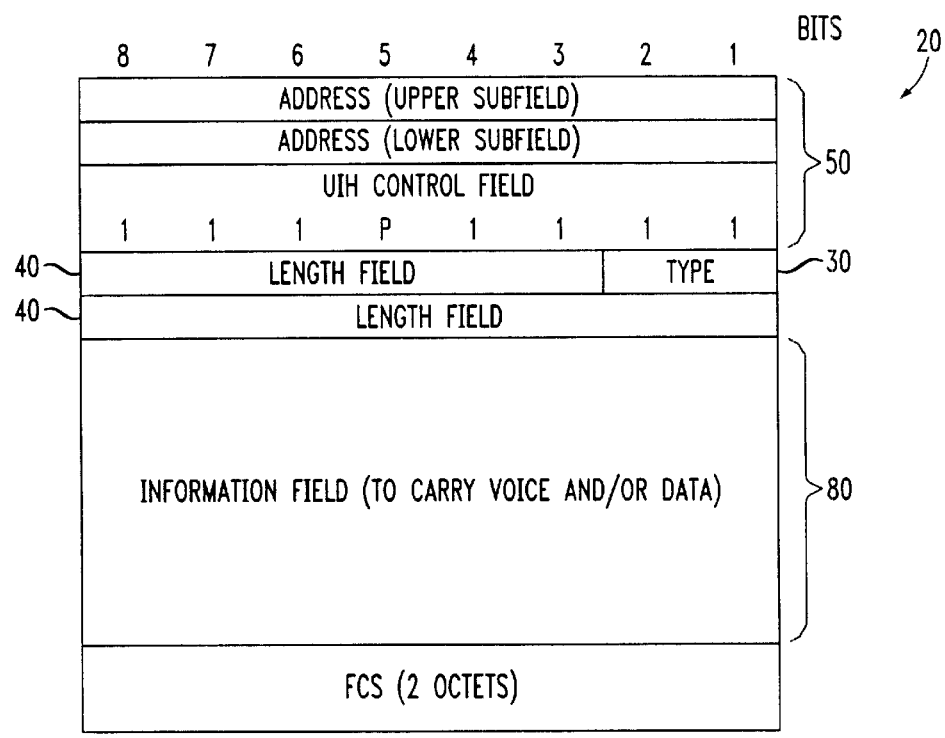
FIG. 2 illustrates the logical structure of a link layer frame used in the invention.

If the data queue 70 is not empty, then multiplexer 100 checks if there is voice left in the voice queue 60. If there is voice in queue 60, then a data packet is concatenated with a voice packet in the same information frame. The resulting structure is referred to as a "concatenated" frame 20 (FIG. 2). The concatenated frame 20 is served for $T_2$ ms.

Figure 1:
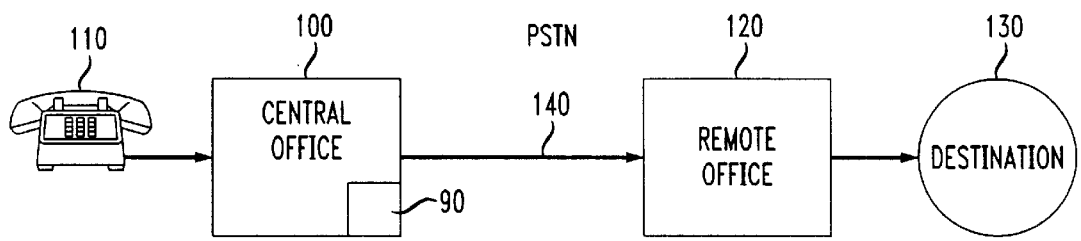
FIG. 1 illustrates a physical configuration of a telephone network in which the invention operates.

If there is no speech in the voice queue 60 (e.g., a speech detector 90 (FIG. 1) has indicated that there is silence), the data queue 70 is served for $T_2$ ms. After $T_2$ ms, the voice queue 60 is checked for remaining speech. Based on the result of that check, the cycle is repeated.

The basic information frame can be of any type, but is preferably a LAP based protocol so that it can be compatible with other ISDN protocols. In such a case, the maximum size of the frame can be selected by these considerations:

1. The maximum size of a LAP frame,
2. The maximum delay that can be accommodated on the sub-rate link without affecting the performance for each type of traffic, and
3. The necessity to keep the size of the non-concatenated frames and the concatenated frame 20 close to each other, to avoid excessive delay for the non-concatenated frames.

The values of $T_1$ and $T_2$ can be predetermined, as known in the art (for instance see K. Sriram, "Bandwidth Allocation and Congestion Control Scheme for an Integrated Voice and Data Network," U.S. Pat. No. 4,914,650, Apr. 3, 1990, incorporated herein by reference). Alternatively, these allocations can be adaptive, as known in the art (for instance see A. Nguyen, N. Bambos and M. H. Sherif, "(T1, T2)-Multiplexing Transmission Scheme for Voice/Data Integrated Networks," Proceedings of IEEE Symposium on Computer and Communications Jun. 27–29, 1995, pp. 430–435, Alexandria, Egypt, incorporated by reference).

In the illustrated embodiment, the multiplexing system and method of the invention does not rely on bit dropping, because there are no toll-quality embedded CELP algorithms presently known in the art. However, once such embedded algorithms exist, then the invention can include a bit dropping congestion controller by appending that type of controller to the described inventive multiplexing technology. A bit dropping technique would decrease the size of the speech packet, and thereby increase the queue service rates for the concatenated frame 20 during congestion periods.

In such a case the congestion measure would be computed as $$F = \alpha S_q + \beta X \quad \text{Equation 3}$$

where $X = \min(D_4, D_4^*)$, $S_q$ is the length of the voice queue 60, $D_4$ is the length of the data queue 70, and $D_4^*$ is a minimum value for X to protect the voice traffic when there is an excess of voiceband data traffic. The parameters $\alpha$ and $\beta$ are weighting factors for the two queues and can be found by appropriate simulation, as understood by persons skilled in the art.

FIG. 2 shows the concatenated frame 20 used for transport of encoded voice and data (illustrated in UIH Frame format). The use of this frame is explained below. The UIH is defined in ITU-T/CCITT Recommendation G.764 incorporated by reference. The frame information field 80 may carry all voice encoded bits, or all data bits, or may contain voice encoded bits and data concatenated together. When the frame information field 80 contains voice and data, the encoded data preferably precedes voice to facilitate the calculation of the check sequence. Type field 30 encodes the composition of frame information field 80. A type field with a value of "00" indicates that the information field 80 in the type frame 30 contains encoded voice. A type field with a value of "01" indicates that the frame information field 80 in the type frame 30 contains data only. A type field with a value of "10" indicates that the frame information field 80 in the type frame 30 contains encoded voice and data concatenated (or combined) together. All other values of type field (i.e., "11") are reserved.

The length field 40 is set to "0" when only voice or data information is in the frame information field 80. When the frame information field 80 contains both voice and data, the length field 40 indicates the number of octets of the encoded voice in the frame information field 80. Again, when the frame information field 80 contains encoded voice and data, the encoded data bits precede voice.

When the frame information field 80 contains only encoded voice, the FCS (Frame Check Sequence) is calculated on the header 50 of the concatenated frame 20 (i.e., the first three octets of the frame). When the field contains only data, the FCS is calculated on the entire concatenated frame 20. (Of course, the frame 20 is only concatenated when voice and data are combined, but the frame is still referred to as "concatenated" for consistency). When the information field contains both voice and data, the FCS is calculated on the header and data portion in the information field. In the implementation described, it is assumed that the maximum information field that can be included in concatenated frame 20 is limited to the maximum frame size that can be transmitted at the data link layer. Since the concatenated frame 20 is used for transport of encoded voice and data, any frames that are lost must be recovered by the endpoints.

The foregoing description of the multiplexing system and method of the invention is illustrative, and variations in construction and implementation will occur to persons skilled in the art. The scope of the invention is accordingly intended to be limited only by the following claims.

What is claimed is:

1. A multiplexer for multiplexing at least first information and second information, comprising:

a first storage unit for storing first information;

a second storage unit for storing second information; and a controller, connected to the first storage unit and to the second storage unit, that concatenates within a single frame at least a portion of the first information to a portion of the second information after a frame header and before a frame trailer when neither the first storage unit nor the second storage unit is empty thereby forming a single-unit hybridized information frame, wherein the first information comprises voice information, the second information comprises voice-band data information and the controller processes the second information for $T_2$ ms when the first storage unit is empty and the second storage unit is not empty.

2. The multiplexer of claim 1, wherein the first storage unit comprises a first queue, and the second storage unit comprises a second queue.

3. The multiplexer of claim 2, wherein the first queue and the second queue each comprise electronic memory.

4. The multiplexer of claim 1, wherein the concatenation produces the hybridized information frame for transmission over a network.

5. The multiplexer of claim 4, wherein the hybridized information frame comprises a UIH frame.

6. The multiplexer of claim 4, wherein the network is a public switched telephone network.

7. The multiplexer of claim 1, wherein the value of $T_2$ is predetermined.

8. The multiplexer of claim 1, wherein the value of $T_2$ is adaptively calculated.

9. The multiplexer of claim 1, wherein the controller unit processes the voice information for $T_1$ ms when the second queue is empty and the first queue is not empty.

10. A method for multiplexing first information and second information, comprising the steps of:

storing first information in a first storage unit;

storing second information in a second storage unit; and controlling the first storage unit and the second storage unit to concatenate within a single frame at least a portion of the first information with a portion of the second information after a frame header and before a frame trailer thereby forming a single-unit hybridized information frame, wherein the first information comprises voice information, the second information comprises voice-band data information and the controller processes the second information for $T_2$ ms when the first storage unit is empty and the second storage unit is not empty.

11. The method of claim 10, wherein the first storage unit comprises a first queue, and the second storage unit comprises a second queue.

12. The method of claim 12, wherein the concatenation produces the hybridized information frame for transmission over a network.

13. The method of claim 12, wherein the hybridized information frame comprises a UIH frame.

14. The method of claim 12, wherein the network is a public switched telephone network.

15. The method of claim 10, wherein the value of $T_2$ is predetermined.

16. The method of claim 10, wherein the value of $T_2$ is adaptively calculated.

17. The method of claim 10, wherein the step of controlling comprises the step of processing the voice information of $T_1$ ms when the second queue is empty and the first queue is not empty.

18. The method of claim 17, wherein the value of $T_1$ is predetermined.

19. The method of claim 17, wherein the value of $T_1$ is adaptively calculated.

* * * * *